United States Patent [19]

Thacker

[11] 4,103,330
[45] Jul. 25, 1978

[54] TASK HANDLING IN A DATA PROCESSING APPARATUS
[75] Inventor: Charles P. Thacker, Palo Alto, Calif.
[73] Assignee: Xerox Corporation, Stamford, Conn.
[21] Appl. No.: 769,254
[22] Filed: Feb. 16, 1977

Related U.S. Application Data
[63] Continuation of Ser. No. 518,679, Oct. 29, 1974.

[51] Int. Cl.² .................... G06F 9/20; G06F 9/18
[52] U.S. Cl. ................................................ 364/200
[58] Field of Search .................. 364/200, 900, 300

[56] References Cited
U.S. PATENT DOCUMENTS

| | | | |
|---|---|---|---|
| 3,568,157 | 3/1971 | Downing et al. | 340/172.5 |
| 3,582,896 | 6/1971 | Silber | 340/172.5 |
| 3,634,883 | 1/1972 | Kreidermacher | 340/172.5 |
| 3,766,532 | 10/1973 | Liebel | 340/172.5 |
| 3,905,025 | 9/1975 | Davis et al. | 340/172.5 |

Primary Examiner—Mark E. Nusbaum
Attorney, Agent, or Firm—Barry Paul Smith

[57] ABSTRACT

A data processing apparatus for processing digital data in accordance with a plurality of predetermined tasks of preassigned priority values and identified by a respective plurality of devices connected to the data processing apparatus. Each device is capable of generating the respective task request signal when requiring service by the data processing apparatus. The data processing apparatus includes a first memory for storing a plurality of executable instructions, a second memory for storing addresses of locations in the first memory, a priority determining device responsive to the task request signals for generating a control signal indicative of the task request signal having the highest current priority value, and an addressing device responsive to the control signal for providing an address to the second memory, the addressed location in the second memory containing the next address of the first memory to be accessed for continuation of the processing of the requesting task and thus servicing of the respective device, wherein said next address is a part of an executed instruction.

11 Claims, 4 Drawing Figures

TASK HANDLING IN A DATA PROCESSING APPARATUS

CROSS-REFERENCE TO RELATED APPLICATION

This application is a continuation of U.S. application Ser. No. 518,679, filed on Oct. 29, 1974 in the name of Charles P. Thacker for TASK HANDLING IN A MICRO-PROGRAMMED DEVICE.

BACKGROUND OF THE INVENTION

This invention relates to data processing and, more particularly, to a data processing apparatus for processing digital data in accordance with a plurality of predetermined tasks of preassigned priority values.

A data processing apparatus can be thought of as being generally comprised of a data section and a control section. The control section supplies the various processing instructions to be executed by the data section in order to perform a sequence of operations constituting a particular task to be carried out or "serviced." The use of microprogrammed data processing is now widespread. In such a data processing apparatus, the instructions stored in an instruction memory of the control section of the processor would be microinstructions.

It is known to provide a microprogrammed data processing apparatus which executes sequences of microinstructions, i.e. "routines," each routine being identified with a particular task to be serviced, wherein the microinstruction routine identified with the task having the highest preassigned priority value will preempt all other routines. Thus, if, during the execution of a routine for the current highest priority task, a new task request is received having a higher priority value, then the old routine is preempted or "interrupted" in favor of the routine identified with the new task.

As is conventional, sequency through a routine of microinstructions identified with a particular task is accomplished by driving a program counter whose output provides an address to the instruction memory. In the past, the contents of the program counter for a particular task would be loaded into a "push-down-stack" register if that task was interrupted by a task having a higher priority. If yet another new task having yet a higher priority was received by the processor, the program counter contents for the first task would be pushed down one more register in the stack, with the contents of the program counter for the second task now being loaded at the top register of the stack. The program counter itself would then be active to address the instruction memory relative to the routine for the task just received.

Although, when the first task was interrupted, the contents of its program counter (now in the push-down-stack) would indicate the next address for the instruction following the last to be executed prior to interrupt, yet the routine for the new interrupting task would have to begin at the very first instruction for that routine and then run through the entire sequence of instructions for that routine, unless itself interrupted by a still higher priority task request. Thus, even though only a particular segment of the routine for the interrupting new task need be executed at this time, such segment identifying a particular function in the overall task to be serviced and commencing at a location different than the start of the entire routine for that task, yet the routine would still have to begin at the first instruction rather than the particular instruction marking the start of the particular segment desired for servicing.

It would be desirable, therefore, to provide a data processing apparatus wherein the routine for any interrupting higher priority task would commence at the instruction identifying the commencement of the particular function of the task actually requesting service, even though this instruction may be other than the first instruction of the entire routine for that task.

SUMMARY OF THE INVENTION

In furtherance of this desirability, a data processing apparatus is provided for processing digital data in accordance with a plurality of predetermined tasks of preassigned priority values and identified by a respective plurality of task request signals in order to service a respective plurality of devices connected to said apparatus, each device capable of generating the respective one of said task request signals when requiring service by said apparatus.

In accordance with the invention, the data processing apparatus comprises first memory means for storing a plurality of executable instructions, second memory means for storing addresses of said first memory means, priority determining means responsive to the task request signals for generating a control signal indicative of the task request signal having the highest current priority value, means responsive to said control signal for providing an address to said second memory means, the addressed location in said second memory means containing the next address of said first memory means to be accessed for continuation of the processing of the requesting task and thus servicing of the respective device, wherein said next address is a part of an executed instruction, and means for addressing said first memory means at said next address.

In accordance with the preferred embodiment, the secondary memory means has a plurality of storage registers respectively associated with the plurality of tasks to be performed. Each register, in storing the next address of the instruction routine identified with the respective task, represents its program counter which is always set to the address of the next instruction in the routine. Any of these registers in the second memory means can be addressed in any order or sequence, dependent only upon the highest priority task to be performed at any particular time. In this manner, the complete sequence of instructions for a new task of highest current priority need not be executed, but rather only those instructions commencing with the instruction identified by the next address stored in the register, i.e., one instruction after where that routine last left off when previously serviced.

Further in accordance with the preferred embodiment, the data processing apparatus is microprogrammed by said instructions which are microinstructions.

These and other aspects and advantages of the present invention will be more completely described below with reference to the accompanying drawings.

DESCRIPTION OF THE PREFERRED EMBODIMENT

Figure 1:
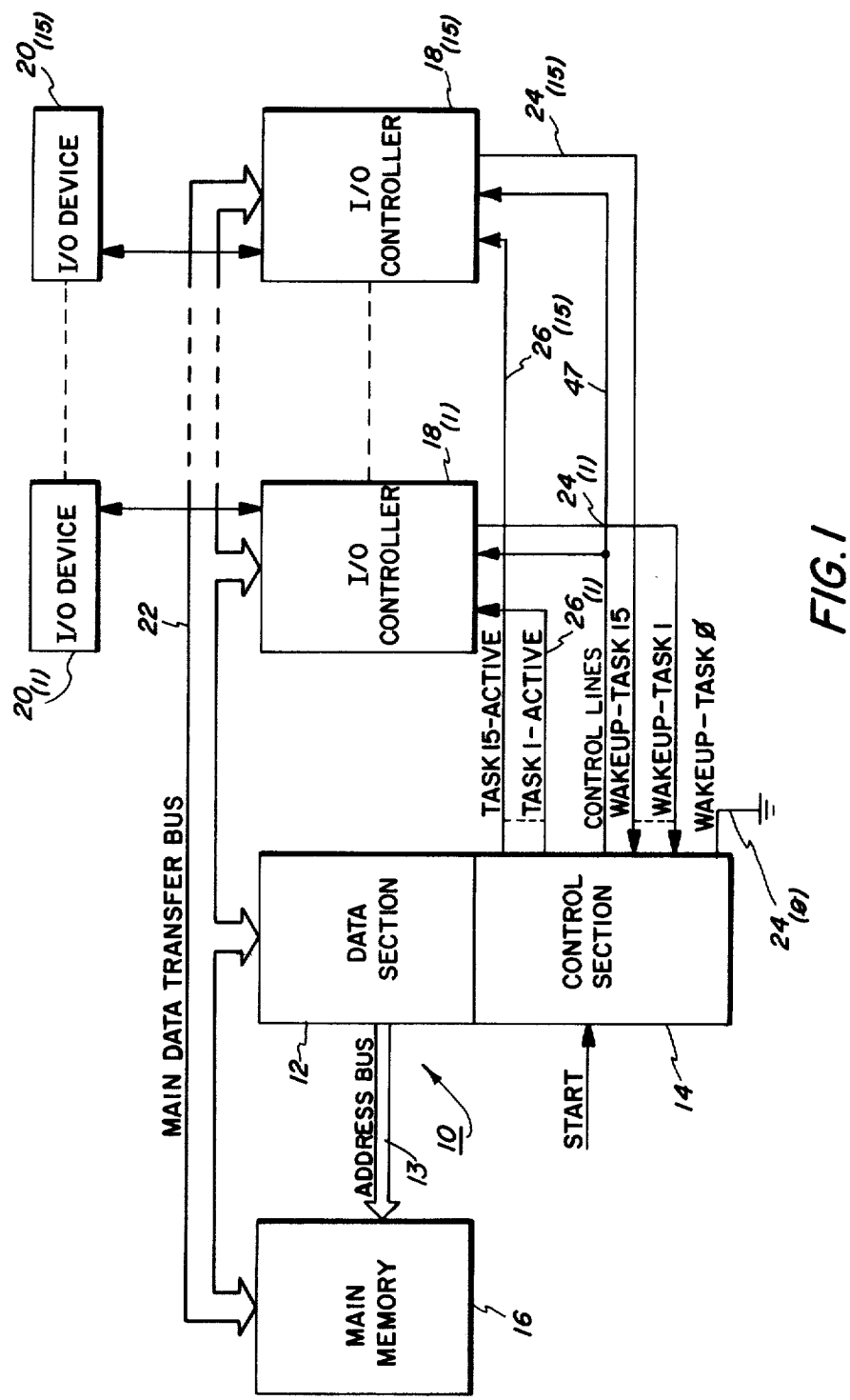
FIG. 1 is a block diagram representation of an exemplary data processing system utilizing the data processing apparatus of the present invention.

Referring to FIG. 1, an exemplary data processing system is disclosed including the data processing apparatus of the present invention therein. More specifically, the data processing apparatus, hereinafter referred to as the central processing unit (CPU) 10 is comprised of a data section 12 and a control section 14. The exemplary system depicted in FIG. 1 also includes a main memory 16 which may be of conventional nature and a plurality of input-output (I/O) controllers 18, e.g., 15 I/O controllers designated $18_{(1)}$ through $18_{(15)}$. Each of the I/O controllers 18 is connected to a respective one of a plurality of I/O devices 20 for controlling same. Examples of typical I/O devices are disk drives, displays, keyboards, etc. The depiction of 15 I/O devices 20 and associated controllers 18 is, of course, only an exemplary number.

As is conventional in data processing systems of the general type depicted in FIG. 1, information is transferred to and from the data section 12 of the CPU 10 by means of a main data transfer bus 22. The information is typically transferred in bit-parallel format. Typical CPU's are designed to operate in 8-bit or 16-bit format, i.e., 8-bit or 16-bit quantities are transferred to and from the data section 12 along the bus 22, which would then be comprised of either at least eight or at least 16 parallel lines. Information may be transferred on the data bus 22 between the main memory 16 and the data section 12, as well as between each of the I/O controllers 18 and the data section 12, as is conventional. Locations in main memory 16 are addressed by an address signal applied on an address bus 13 from the data section 12.

The specific nature of the main memory 16, data section 12 of the CPU 10 and the data bus 22 form no part of the present invention and will not be described in detail herein. If desired, however, examples of typical components of this nature that may be employed in the system of FIG. 1 are disclosed in the aforementioned parent application, Ser. No. 518,679, which is hereby incorporated by reference.

As for the I/O controllers 18, these also can be any well known conventional type consistent with the particular I/O device 20 they control. In view of the present invention, the only criteria required of these controllers is that they provide a task request signal in the form of a "wake-up" command whenever the particular controller 18 requires servicing by the CPU 10. For example, if the I/O device $20_{(1)}$ is a keyboard and a character key has been depressed, the controller $18_{(1)}$ would apply a wake-up command to the CPU 10 informing it that it requires some service, i.e., a sequence of instructions related to the depressing of a character key is to be executed.

Each I/O controller 18 is identified by a unique task request ("wake-up") signal that is applied along a line 24 to the control section 14 of the CPU 10 when that controller requires servicing. In order for the controller 18 to be informed when the CPU 10 is executing instructions relating to the requested service, the control section 14 includes means to be described below for applying a "task-active" status signal back to the controller. These task-active status signals are applied on lines 26 from the control section 14 to the controllers 18, as shown in FIG. 1.

Figure 2:
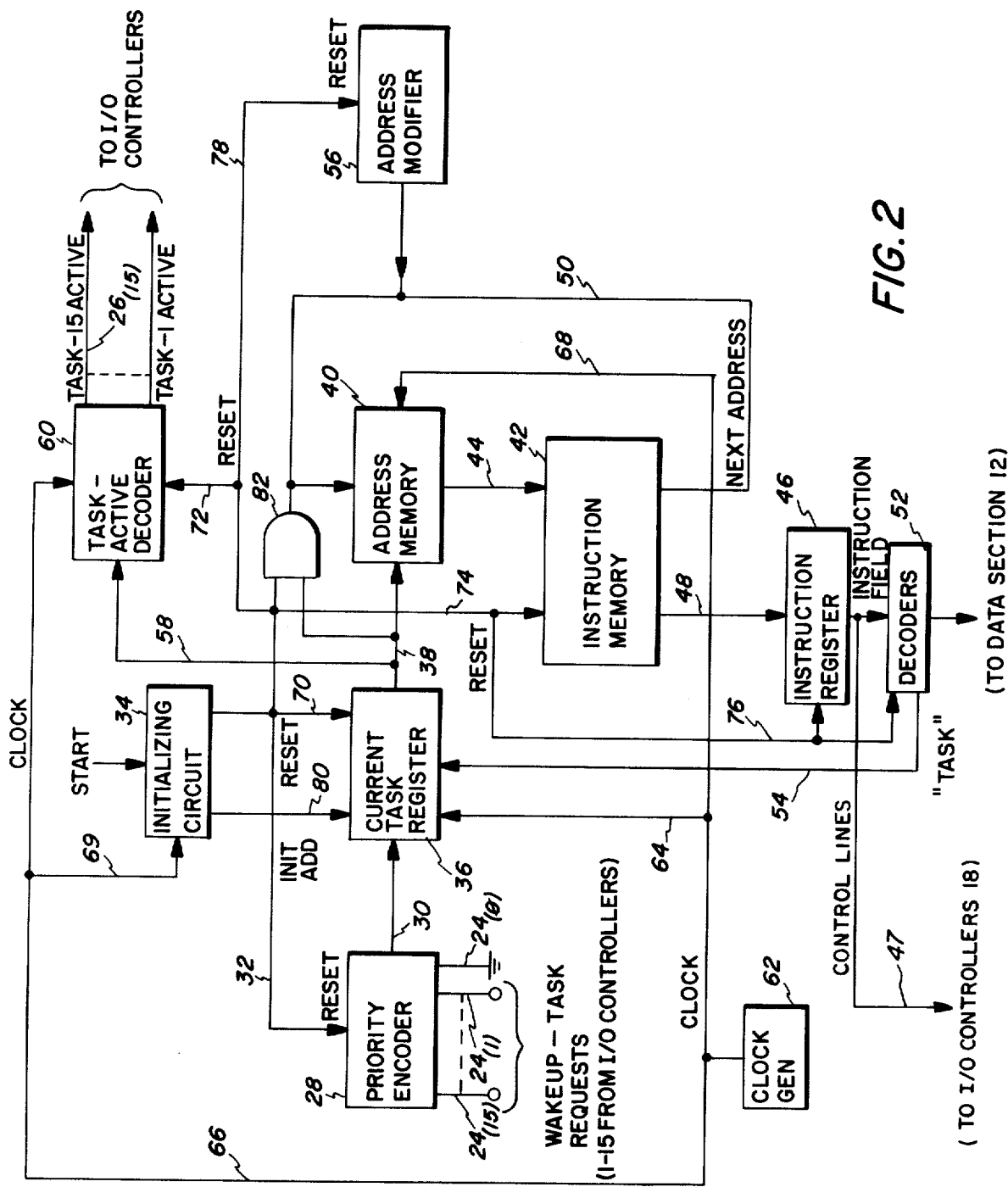
FIG. 2 is a block diagram representation of the control section of the data processing apparatus of the present invention.

Reference is now had to FIG. 2 where the unique control section 14 of the CPU 10 will be described. At the outset, it must be stated generally that the control section 14 applies instructions to the data section in order for them to be executed. Further, the instructions are forwarded in accordance with a particular sequence or routine to be carried out and identified with a particular task to be serviced. Still further, the control section 14 includes means to be described below for determining which of a plurality of task request signals that may have been applied to the control section 14 has the highest current priority value. More specifically, each of the plurality of tasks to be serviced is preassigned a unique priority value. Thus, servicing I/O controller $18_{(1)}$ may be of higher priority than servicing I/O controller $18_{(15)}$. The control section 14 then forwards instructions to the data section for execution that are associated with the highest current task to be serviced.

Referring now in more detail to FIG. 2, the control section 14 includes a priority encoder 28 which has 16 task request inputs connected to the 16 task request lines 24. As explained above, task request signals for tasks 1-15 are provided from the respective I/O controllers 18. Additionally, a task request signal for task $\phi$, which requests servicing the main program, is always present, as will be explained in more detail below. The priority encoder 28 includes circuitry (also to be described below) for generating a multi-bit control signal on a respective plurality of lines 30 (only one shown) related to the highest priority task request signal current applied as an input to the encoder 28. The priority encoder 28 includes a further input for receiving a RESET signal on a line 32 from an initialize circuit 34 to be described in more detail below. The priority encoder 28 also will be described in more detail below in connection with FIG. 3.

Now then, the control signal developed on lines 30 is applied to respective inputs of a current task register 36 which responds to such control signal for generating a multi-bit address signal that is applied in bit-parallel format on a respective plurality of lines 38 from the register 36 to respective inputs of an address memory 40. The address memory 40 includes a plurality of storage locations, preferably defined by a respective plurality of multi-bit registers (not shown). There are preferably 16 such registers included in the address memory 40, each one being addressed by a unique multi-bit code defined by the address signal applied thereto from the current-task register 36 on lines 38. The current task-register 36 will be described in more detail below in connection with FIG. 3.

Each one of the 16 registers in the address memory 40 is associated with a respective one of the 16 tasks to be performed, as defined above. In actuality, each of the address memory registers is capable of storing the next address of an executable microinstruction stored in a microinstruction memory 42. In this respect, each of the sixteen address memory registers may be thought of as a program counter for its respective task to be serviced relative to the corresponding microinstruction routine stored in the instruction memory 42.

Each instruction stored in the memory 42 is accessed in response to a corresponding address signal applied on address lines 44 from the address memory 40. Each instruction includes an instruction field preferably comprised of 22 bits, and a next-address field preferably comprised of 10 bits. The instruction field is loaded into an instruction register 46 on lines 48 and is then applied through appropriate decoders 52 to the data section 12 of the CPU. The next-address field is fed back on lines 50 to the currently addressed register in the address memory 40. In this manner, each of the 16 registers in the memory 40 will always contain the address of the next microinstruction stored in the instruction memory 42 to be executed in accordance with the particular task to be serviced. This is an important feature of the present invention for reasons to be described below.

A portion of the 22-bit instruction field of each microinstruction may be dedicated to various special functions some of which are applied on control lines 47 to respective ones of the I/O controllers 18 for controlling same. In accordance with the preferred embodiment, there is at least one four-bit special function "sub-field" in the instruction field of each microinstruction, wherein one of the four-bit codes capable of being defined is representative of a "TASK" function. A TASK signal component of an accessed instruction, upon being decoded by an appropriate one of the decoders 52, is applied on a line 54 to the current task register 36 for enabling same to load an address signal, representing the current highest priority task requesting service. This address signal is then applied to the address memory 40.

It will be appreciated that a TASK signal can be presented in any desired microinstruction during any routine to be executed. Normally, a TASK signal would be generated at least once during each microinstruction routine in order to enable any higher priority task awaiting service to interrupt the current routine in order to be serviced by the CPU 10. If a particular task to be serviced has a microinstruction routine that carries out a plurality of different functions that can be independently serviced, than a TASK signal would normally be written into the last microinstruction of each segment of the routine identified with a particular one of such functions.

Continuing with a description of FIG. 2, the control section 14 of the CPU 10 further includes conventional address modifier circuits 56 which, in a known manner, are capable of modifying the next-address signal being fed back on lines 50 from the instruction memory 42 to the address memory 40. As is conventional, such address modifiers are used for branching. The specific nature of the address modifier 56 forms no part of the present invention and thus shall not be described in detail. Nonetheless, such details, if desired, may be had from a review of the aforementioned parent application, Ser. No. 518,679.

The multi-bit address signal developed at the output of the current task register 36, in addition to being applied to the address memory 40 on lines 38, is also applied on lines 58 to a task-active decoder 60. The decoder 60 responds to the address signal output of the register 36 and generates one of the fifteen TASK-ACTIVE signals alluded to earlier on its respective line 26, dependent upon the current highest priority task to be serviced. As will be seen below, the decoder 60 includes a delay circuit for delaying the application of a TASK-ACTIVE signal to the respective I/O controller 18 by one clock cycle of the processor. In this manner, the appropriate TASK-ACTIVE signal will be generated at a time corresponding to the execution of instructions related to the task being serviced. The task-active decoder 60 will be described in more detail below in connection with FIG. 4.

The data section 12 as shown in FIG. 2 also includes a clock generator 62 for generating appropriate CLOCK signals for application of the current-task register 36 on a line 64, the task-active decoder 60 on line 66, the address memory 40 on line 68, and the initialization circuit 34 on a line 69.

Still referring to FIG. 2, the initialization circuit 34 is responsive to a START signal generated when the system is turned on by the operator. Upon receipt of the START signal, conventional circuitry in the circuit 34 causes a RESET signal to be generated which is applied to the priority encoder 28 on line 32, to the current task register 36 on a line 70, to the task-active decoder 60 on a line 72, to the instruction memory 42 on a line 74, to the instruction register 46 and decoders 52 on a line 76, and to the address modifier 56 on a line 78. Upon receipt of RESET signal, these various components of the control section 14 are reset.

The initialization circuit 14, in response to a START signal, also generates a multi-bit initialization address signal on a respective plurality of lines 80. This signal is preferably a four-bit signal that is initially zero, i.e., 0000, and is incremented by one at the rate of the CLOCK signal pulses applied on line 69. The RESET signal is maintained for 16 cycles, i.e. 16 CLOCK signal pulses, at which time the initialization address on lines 80 will increment from zero (0000) to 15 (1111). As will be described below, the address signal output of the current task register 36 during initialization is identical to the initialization address signal. During initialization, the address signal output of the current task register 36 is applied through an AND-gate 82, which is enabled by a RESET signal from the intitialization circuit 34, to the address memory 40. In this manner, the address signal (0000) will be loaded into the register number zero in the address memory 40, the address signal one (0001) into register number one, and so on. This process initializes the address memory by setting the various registers therein at their respective starting values. This concept will be described in more detail below in connection with FIG. 3.

Figure 3:
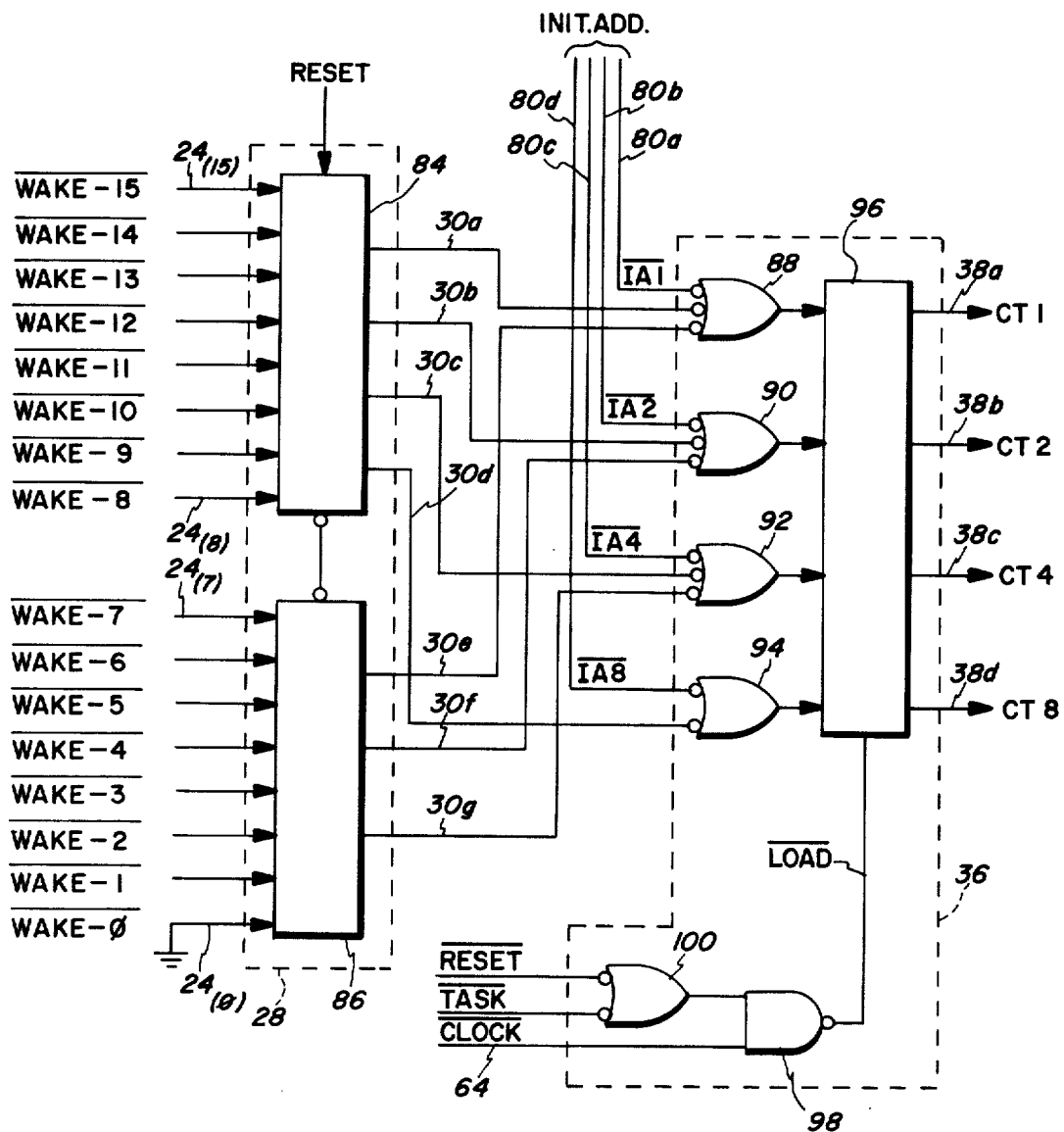
FIG. 3 is a schematic diagram of the priority encoder depicted in FIG. 2.

Referring now to FIG. 3, the priority encoder 28 preferably comprises two 8-bit-to-3-bit encoders 84 and 86, thereby deferring a composite 16-bit-to-4-bit encoder. The encoders 84 and 86 may each be a model 9318 encoder manufactured by Fairchild. Each of the encoders 84 and 86 are adapted to receive eight of the 16 task request signals. The task request signal for task $\phi$ shall hereinafter be referred to as $\overline{\text{WAKE-}\phi}$, for task 1 as $\overline{\text{WAKE-1}}$, and so on. Thus, the lines $24_{(\phi)}-24_{(7)}$ are coupled to respective inputs of the encoder 86, and lines $24_{(8)}-24_{(15)}$ are coupled to respective inputs of the encoder 84. Any one or more of the task request signals may be present at any instant of time. The $\overline{\text{WAKE-}\phi}$ signal is always present (low level) since it is coupled to ground. Thus task $\phi$, i.e., the main microprogram, is always requesting service.

The encoders 84 and 86 each generate a 4-bit output code on lines 30a-30d (decoder 84) and on lines 30e-30g (decoder 86) for application to the current task register 36. This code identifies the highest priority task request signal that is pending at any instant of time. The encoder 84 supplies 4 bits and the encoder 86 supplies the remaining 3 bits on output lines 30e-30g. The fourth output line of encoder 86 is unused and is therefore interpreted as having the value zero by the current task register 36.

Still referring to FIG. 3, the current task register 36 comprises a bank of four inverted-input OR-gates 88, 90, 92 and 94. A first input of each of these gates is connected to a respective one of the four initialization address lines 80. Thus, the first initialization address line 80a is connected to the first input of gate 88 for applying an initialization address bit $\overline{IA1}$ thereto, the address line 80b is connected to the first input of gate 90 for applying the address bit $\overline{IA2}$ thereto, the address line 80c is connected to the first input of gate 92 for applying the address bit $\overline{IA4}$ thereto, and the address line 80d is connected to the first input of the gate 94 for applying the address bit $\overline{IA8}$ thereto. Additionally, the control signal bits on lines 30a-30d are respectively applied to a second input of each of the gates 88-94, and the control bits on lines 30e-30g are respectively applied to a third input of each of the gates 88-92. The gate 94 only has two inputs.

When any of the input signals to each gate 88-94 is low, a high level (true) signal will be generated at its output. The state of the outputs of the gates 88-94 is loaded in parallel into a four-bit register 96 (forming part of the current task-register 36) upon receipt of a low level $\overline{LOAD}$ command at an appropriate input terminal thereof. The value stored in the register 96 represents the address for address memory 40 corresponding to the current highest priority task requesting service, as identified by the control signal on lines 30. This 4-bit address signal is applied on four output lines 38a-38d from the register 96.

A low level $\overline{LOAD}$ command is generated at the output of a two input NAND-gate 98 when and only if both inputs are high. A first input of the gate 98 is connected to the clock generator 62 on line 64 for receiving CLOCK signals therefrom, and the second input of the gate 98 is connected to an inverted-input OR-gate 100. A first of two inputs of the gate 100 is adapted to receive a $\overline{TASK}$ signal as applied on line 54 from a respective decoder 54 and through an inverter (not shown). The second input of the gate 100 is adapted to receive a $\overline{RESET}$ signal as applied on line 70 from the initialize circuit 34 and through another inverter (not shown). Thus, a low level $\overline{LOAD}$ signal will be present when, during the occurence of a CLOCK signal, either or both the $\overline{RESET}$ signal or $\overline{TASK}$ signal is low.

As stated earlier, the 4-bit address signal from the current task register 36 is applied on lines 38 to the address memory 40. As also stated earlier, the address memory 40 preferably is comprised of 16 registers (not shown), each of which is preferably 12 bits in length. Each 12-bit register is capable of being addressed by a unique 4-bit address code applied in parallel on the lines 38. The address memory 40 receives the 10-bit next-address field of an instruction called out of the memory 42 and fedback on lines 50, and such next address is loaded into the particular one of the 16 12-bit registers associated with the task being serviced, as identified by the 4-bit address code from register 36. Two of the 12 bits of each register are not used for next address storage. The individual bits of the address code on lines 38 are identified as CT1 (line 38a), CT2 (line 38b), CT4 (line 38c) and CT8 (line 38d).

The next-address signal stored in a particular register in the memory 40 is accessed from the memory 40 upon receipt of the unique 4-bit address code (CT1-CT8). As soon as the addressed instruction is accessed from the memory 42, the new next-address field thereof is loaded back into the same register of memory 40. The significance of this relationship is important and will be described in more detail below.

Any suitable, conventional address memory capable of functioning in the manner expected of memory 40 as above described may be utilized in accordance with this invention. A presently preferred memory arrangement is disclosed in the aforementioned parent application, Ser. No. 518,679. Further, any suitable, conventional microinstruction memory 42, instruction register 46 and decoders 52 capable of functioning in the manner above-described can be utilized. As with memory 40, presently preferred devices of this nature are disclosed in application Ser. No. 518,679. As the specific nature of these components form no part of the present invention, they will not be described in detail herein.

Figure 4:
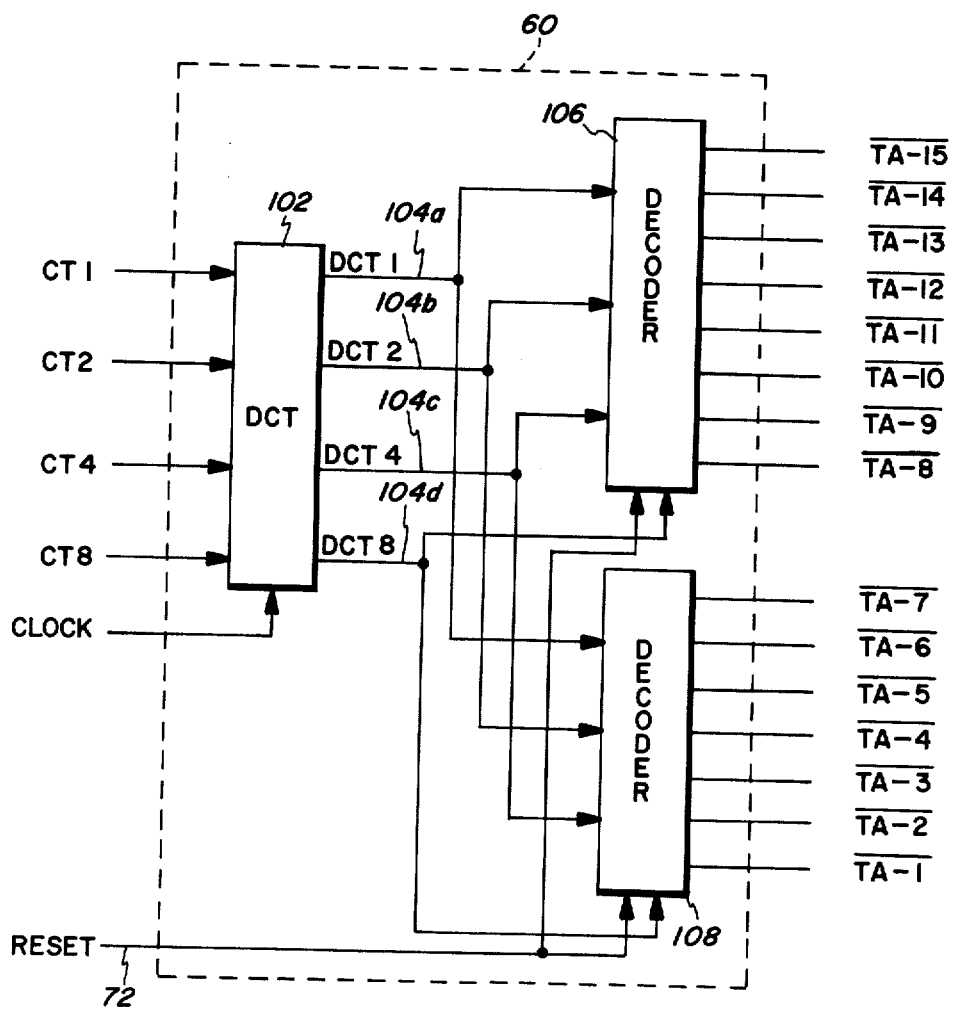
FIG. 4 is a schematic diagram of the task-active decoder depicted in FIG. 2.

Reference is now had to FIG. 4 where the task-active decoder 60 will be described. The task-active decoder 60 includes a latching circuit (DCT) 102 having four input lines 58a-58d respectively adapted to receive the four bits (CT1-CT8) of the address signal from the current task register 36. The purpose of the latching circuit 102 is to delay the application of a TASK-ACTIVE signal to its respective I/O controller 18 by one clock cycle of the processor so that the proper TASK-ACTIVE signal will be true during the time microinstructions related thereto are being executed by the CPU 10.

There are four output lines (104a-104d) from the latching circuit 102 that are respectively adapted to carry output signals DCT1-DCT8. These latter signals are identical to signals CT1-CT8, but are delayed in time, as explained above. The decoder 60 further comprises a pair of 4-bit-to-8-bit decoders 106 and 108. These decoders may each be constituted by a model 3205 decoder manufactured by the Intel Corporation, and the latching circuit 102 may be constituted by the model SN74174 latch manufactured by Texas Instruments, Inc.

Now then, the DCT1 signal is applied on line 104a to first inputs of each of the decoders 106 and 108, the DCT2 signal on line 104b to second inputs of these decoders, the DCT4 signal to third inputs of these decoders, and the DCT8 signal to fourth inputs of the decoders 106 and 108. Each decoder 106 and 108 also has a reset input adapted to receive a RESET signal applied thereto on line 72 from the initialization circuit 34.

Depending on the 4-bit code DCT1-DCT8 as determined by the address signal code CT1-CT8, a respective one of the fifteen TASK-ACTIVE signals will be generated for application to its respective I/O controller 18. It will be noted that only seven TASK-ACTIVE lines are used from the decoder 108 since task $\phi$ is the main microprogram and does not require a TASK-ACTIVE indication.

The operation of the data processing apparatus of the present invention will now be described with reference to FIGS. 1-4. As soon as the apparatus is turned on, the START signal is generated which causes the initialize circuit 34 to generate an initialization address ($\overline{IA1}$-$\overline{IA8}$) and a RESET signal. The RESET signal resets the priority encoder 28, the current task register 36, the task-active decoder 60, the instruction memory 42, the instruction register 46, the decoders 52, and the address modifier 56. The initialization address $\overline{IA1}$-$\overline{IA8}$ is then loaded into the current task register 36 and immediately output as address signal CT1-CT8, due to the low level RESET signal at the gate 100. This address starts at zero, i.e., 0000, which addresses register number zero in address memory 40, and is itself loaded into such register through the gate 82, as enabled by the RESET signal. The initialization address $\overline{IA1-IA8}$ will then increment to one (0001) at the next CLOCK signal pulse received by the circuit 34 on line 69. The address signal CT1-CT8 will then be one (0001) which will address register number one in memory 40 and additionally be loaded therein. This procedure is repeated fourteen more times in order for address codes 2-15, i.e., CT1-CT8 is 0010-1111, to address the respective registers 2-15 in the memory 40 and then be loaded therein. Of course, the address codes CT1-CT8 will be loaded into the four least significant bit positions of each register in the memory 40.

At the termination of this initialization procedure, i.e., 16 cycles, the RESET signal will go false. Let us assume that at this occurrence none of the I/O controllers 18 are requesting service. Consequently, the only task request signal that will be true will be task φ, i.e., $\overline{WAKE-\phi}$. Thus, the processor 10 will begin executing instructions related to the main microprogram routine. This occurs by applying a control signal on lines 30 representing that task φ is the current highest priority task requesting service. The current task register 38 will then generate an address signal code (CT1-CT8) on lines 38 which would be 0000 in order to address register number zero in the memory 40. That register has been preloaded with count zero, i.e., 000000000000, due to the initialization routine described above. Consequently, this register number zero in the memory 40, which is in essence a program counter, will then be stepped by CLOCK signals applied thereto on line 68 from the clock generator 62.

Each time the register-0 is incremented, a new address is applied on lines 44 to address the instruction memory 42 in order to access the respective microinstruction. When so accessed, the next-address field (10-bits) of the microinstruction is fed back on lines 50 and loaded into register-0 in memory 40. This next address identifies the successor microinstruction in the routine for task φ to be executed. The instruction field of the microinstruction is fed through the register 46 and decoders 52 to the data section 14 for execution thereof.

Suppose that after the first instruction in the routine for task φ is accessed out of memory 42 and executed, the I/O controller $18_{(15)}$ requires some servicing. The task φ routine will continue until an instruction is accessed having a "TASK" signal present in its instruction field. This signal is decoded by an appropriate one of the decoders 52 and then applied along lines 54 through an inverter and to one input of the gate 100. This causes the current task register 36 to be loaded with the value 15 (1111) which is the number of the current highest priority task requesting surface, as assumed above. The address code CT1-CT8 will then have the value 1111 applied on lines 58 to the task-active decoder 60.

More specifically, after the first executed task φ instruction, the I/O controller $18_{(15)}$ required service and applied a low $\overline{WAKE-15}$ signal to the priority encoder 28. The encoder 28 would then have determined task 15 to be of higher priority than task φ and sent a control signal having the value 1111 on lines 30 to the current task register 36. The latter would, upon receipt of a TASK signal on line 54 as indicated above, have been loaded with this code 1111. This code is applied on lines 38 to the address memory 40, causing register number 15 therein to be accessed. Since this would be the first time task 15 is serviced, the register number 15 in memory 40 would have been preloaded to an initial starting value of 000000001111 by the initialization procedure above described. The CPU 10 will then execute microinstructions associated with the task 15.

If task 15 fails to complete the particular function embodied in its routine that is associated with the requested service before being itself interrupted by a higher priority task request, it will be appreciated that when the last microinstruction was accessed out of the memory 42 for task-15, the next-address field thereof was loaded into register-15 in memory 40. Consequently, when task 15 is later returned to for completion of the requested service, the routine will begin at the instruction following the last instruction in that routine to be executed.

It is an important aspect of the present invention that if task-15, for example, completed one of a number of functions in its routine that initiated the request for service so that the task request signal for task 15, i.e., $\overline{WAKE-15}$ would be removed, if later the succeeding function in the task 15 routine had to serviced, the address memory 40 would start addressing the instruction memory 42 at the beginning of the sequence of instructions relating to the new succeeding function, and not at the beginning of the entire routine, as had been the case in the past. Thus, if the new succeeding function in task 15 to be performed is located halfway through the task-15 microinstruction routine, the memory 40 will know to address it directly and immediately since the last instruction of the sequence relating to the first function serviced contained in its next address field the address for the first instruction for the new succeeding function, and such next address was loaded into the register-15 in the memory 40. The next addresses in the 16 registers in memory 40 thus "point" to the exact instruction in the corresponding routine that is to be executed next when that routine is next serviced.

Although the present invention has been described with respect to a presently preferred embodiment, it will be appreciated by those skilled in the art that various modifications, substitutions, etc. may be made without departing from the spirit and scope of the invention as defined in and by the following claims.

What is claimed is:

1. A data processing apparatus for processing digital data in accordance with a plurality of predetermined tasks of preassigned priority values and identified by a respective plurality of task request signals in order to service a respective plurality of devices connected to said apparatus, each device capable of generating the respective one of said task request signals when requiring service by said apparatus, said apparatus comprising:

first memory means for storing a plurality of executable instructions each containing the address of a successor instruction;

means for addressing said first memory means to provide for the execution of selected instructions, said addressing means including second memory means organized to contain next addresses of said first memory means in respective locations thereof, each of said locations being dedicated to one of said predetermined tasks;

means for executing said selected instructions;

means coupled to said addressing means for selecting said locations in said second memory means whereby a particular next address is selected for addressing said first memory means;

means coupled to said first memory means for loading the address of a successor instruction contained in an addressed instruction into the dedicated location in said second memory means such that the successor instruction may be subsequently selected for execution; and priority determining means responsive to said task request signals for providing a control signal to said selecting means enabling said selecting means to select the location in said second memory means dedicated to the task with the highest current priority value.

2. The apparatus of claim 1, wherein said instructions are microinstructions.

3. The apparatus of claim 1, further comprising means coupled to said selecting means and responsive to the selection of a location in said second memory means by said selecting means for applying a task-active signal to the respective one of said plurality of devices associated with the task to which said selected location is dedicated.

4. The apparatus of claim 3, wherein said means for applying includes means for delaying the application of said task-active signal to the said respective one of said devices by a predetermined time period.

5. The apparatus of claim 4, wherein said instructions are microinstructions.

6. A data processing apparatus for processing digital data in accordance with a plurality of predetermined tasks of preassigned priority values and identified by a respective plurality of devices connected to said apparatus, each device capable of generating the respective one of said task request signals when requiring service by said apparatus, said apparatus comprising:

first memory means for storing a plurality of executable instructions;

second memory means for storing addresses of locations in said first memory means;

priority determining means responsive to said task request signals for generating a control signal indicative of the task request signal having the highest current priority value;

means responsive to said control signal for providing an address to said second memory means, the addressed location in said second memory means containing the next address of said first memory means to be accessed, wherein said next address is a part of an executed instruction that was loaded into the addressed location of said second memory means;

means for addressing said first memory means at said next address; and means for executing the addressed instruction for continuation of the processing of the requested task and thus servicing the respective device.

7. The apparatus of claim 6, wherein said instructions are microinstructions.

8. The apparatus of claim 6, wherein said priority determining means, upon receipt of a new task request signal having a higher priority value than the current task being serviced, modifies said control signal in order to cause said providing means to address a different location in said second memory means corresponding to said new task, said different location containing the next address of said first memory means to be accessed for continuation of the processing of said new task.

9. The apparatus of claim 8, further comprising means for storing in said second memory means the subsequent next address to be accessed in said first memory means at the location currently being addressed by said providing means.

10. The apparatus of claim 9, wherein said subsequent next address is a part of the instruction being executed.

11. The apparatus of claim 10, wherein said instructions are microinstructions.

* * * * *